(12) United States Patent
Lee et al.

(10) Patent No.: US 9,444,339 B2
(45) Date of Patent: Sep. 13, 2016

(54) DC-DC CONVERTER

(71) Applicant: GREEN SOLUTION TECHNOLOGY CO., LTD., New Taipei (TW)

(72) Inventors: Li-Min Lee, New Taipei (TW); Chao Shao, Wuxi (CN); Shian-Sung Shiu, New Taipei (TW); Quan Gan, Wuxi (CN)

(73) Assignee: GREEN SOLUTION TECHNOLOGY CO., LTD., New Taipei (TW)

( * ) Notice: Subject to any disclaimer, the term of this patent is extended or adjusted under 35 U.S.C. 154(b) by 302 days.

(21) Appl. No.: 13/894,394

(22) Filed: May 14, 2013

(65) Prior Publication Data

US 2014/0197808 A1 Jul. 17, 2014

(30) Foreign Application Priority Data

Jan. 11, 2013 (CN) .......................... 2013 1 0012294

(51) Int. Cl.
*H02M 3/158* (2006.01)
*H02M 3/156* (2006.01)

(52) U.S. Cl.
CPC ............. *H02M 3/158* (2013.01); *H02M 3/156* (2013.01); *H02M 2003/1566* (2013.01)

(58) Field of Classification Search
CPC .................... H02M 2003/1566; H02M 3/156; H02M 3/158
See application file for complete search history.

(56) References Cited

U.S. PATENT DOCUMENTS

| 6,850,045 B2 * | 2/2005 | Muratov | H02M 3/1584 323/240 |
| 6,850,102 B2 * | 2/2005 | Hsu | H03L 7/0895 327/157 |
| 6,980,039 B1 * | 12/2005 | Dening | H02M 1/12 327/164 |
| 7,132,891 B1 * | 11/2006 | Dening | H03F 1/0227 330/133 |
| 7,190,150 B2 | 3/2007 | Chen et al. | |
| 7,800,353 B2 | 9/2010 | Komiya | |
| 7,855,864 B2 | 12/2010 | Andruzzi et al. | |
| 8,330,437 B1 * | 12/2012 | Hartman | 323/271 |
| 9,225,168 B2 * | 12/2015 | Ogawa | H02J 1/00 |
| 2003/0006650 A1 * | 1/2003 | Tang | G06F 1/26 307/43 |
| 2004/0183511 A1 * | 9/2004 | Dening | H02M 3/156 323/282 |
| 2012/0105032 A1 * | 5/2012 | Huard | 323/271 |

FOREIGN PATENT DOCUMENTS

| CN | 1914575 A | 2/2007 |
| CN | 101123395 A | 2/2008 |

* cited by examiner

*Primary Examiner* — Fred E Finch, III
*Assistant Examiner* — Rafael O De Leon Domenech
(74) *Attorney, Agent, or Firm* — CKC & Partners Co., Ltd.

(57) ABSTRACT

A DC-DC converter, adapted to control a converting circuit to convert an input voltage into an output voltage, is disclosed. The converting circuit comprises a switch module and an LC filter, the switch module is coupled to the input voltage, and the LC filter is coupled to the switch module and provides the output voltage. The DC-DC converter comprises a system control circuit, a driver circuit, and an output voltage adjusting circuit. The system control circuit generates a switch control signal according to a reference voltage and a state of the LC filter. The driver circuit controls the switch module according to the switch control signal for adjusting the output voltage in response to the reference voltage. The output voltage adjusting circuit determines whether adjusting the output voltage toward a predetermined adjusting voltage according to an adjusting reference voltage and a detecting voltage indicative of the output voltage.

12 Claims, 16 Drawing Sheets

DC-DC CONVERTER

RELATED APPLICATIONS

This application claims priority to Chinese Application Serial Number 201310012294.5, filed Jan. 11, 2013, which is herein incorporated by reference.

BACKGROUND OF THE INVENTION (1) Field of the Invention

The present invention relates to a DC-DC converter, and more particularly relates to a DC-DC converter with an output voltage adjusting circuit.

(2) Description of the Prior Art

A conventional power management chip controls a converting circuit transforming an input voltage into a suitable output voltage for driving a load. The power management chip adjusts the output voltage according to a reference voltage, and the reference voltage may be an external signal. For example, in a graphic processing unit (GPU) or a central processing unit (CPU), the system varies the output voltage with a change of the load to save the power. In the situation of the light load, the power management chip controls operation, for example, in a power-saving mode of a diode emulation mode, or even suspend mode. When the reference voltage is adjusted low or the output voltage is suddenly high due to outside interference, the system can't respond in time which causes the power management chip erroneously enters a protection mode.

FIG. 1 is a diagram showing the waveforms in a conventional power management chip. When the power management chip enters into the power-saving mode at a time point t1, a level of a reference voltage is reduced for reducing an output voltage Vout so as to reduce a power consumption of the load (for example, GPU and CPU). Because the load operates under light load, the power management chip enters into the diode emulation mode which turns off the high-side transistor and the low-side transistor and makes the output voltage Vout to keep at a constant value. However, a target voltage Vor corresponding to the reference voltage changes as the reference voltage which makes the power management chip determine the output voltage being over-voltage and execute an over voltage protection at a time point t2.

FIG. 2 is schematic diagram of a power converting circuit in the U.S. Pat. No. 7,855,864. The power converting circuit comprises a control circuit 20, a regulation circuit 22, and a converting circuit. The converting circuit comprises a high-side transistor SW1, a low-side transistor SW2, an inductance L and a capacitance C. The converting circuit is coupled to an input voltage Vin and the converting circuit outputs an output voltage Vout according to control signals S1 and S2 of the regulation circuit 22. A voltage detecting circuit VD is coupled to an output end of the converting circuit for detecting the output voltage Vout and generating a detecting voltage VFB. The control circuit 20 receives a reference voltage Vr and the detecting voltage VFB, and accordingly determines the converting circuit operating in a continuous current mode or a discontinuous current mode and generates a module control signal Smo. The regulation circuit 22 generates the control signals S1 and S2 according to the module control signal Smo and the detecting voltage VFB for respectively controlling the high-side transistor SW1 and the low-side transistor SW2 to stabilize the output voltage Vout.

The control circuit 20 detects the situation of the load to determine whether reverting to the continuous current mode when the power converting circuit operating in the discontinuous current mode. Thereby, when the reference voltage or the output voltage suddenly changes, the power converting circuit can be timely switched to the continuous current mode for adjusting the output voltage. This control way is realized through the mode switching. However, such frequently switch mode will bring the switching loss which is unfavorable to conversion efficiency in light load.

SUMMARY OF THE INVENTION

In view of the power management chip and the power converting circuit may erroneously enters protection modes or switches the operation mode frequently. The present invention provides a DC-DC converter, which directly charges and discharges an LC filter of a converting circuit for adjusting the output voltage in a power-saving mode. Hence, the output voltage is timely adjusted corresponding to a target voltage for avoiding erroneous protection and reducing the switch loss of the converting circuit as well.

To accomplish the aforementioned and other objects, a DC-DC converter of the present invention is adapted to control a converting circuit for converting an input voltage into an output voltage. The converting circuit comprises a switch module and an LC filter. The switch module is coupled to the input, voltage, and the LC filter is coupled to the switch mode and generates the output voltage. The DC-DC converter comprises a system control circuit, a driver circuit and an output voltage adjusting circuit. The system control circuit generates a switch control signal according to a reference voltage and a state of the LC filter. The driver circuit controls the switch module according to the switch control signal to adjust the output voltage in response to the reference voltage. The output voltage adjusting circuit is coupled to the LC filter and determines whether adjusting the output voltage according to an adjusting reference voltage and a detecting voltage indicative of the output voltage. If yes, the output voltage adjusting circuit adjusts the output voltage toward a predetermined adjusting voltage.

The present invention also provides a DC-DC converter, adapted to control a converting circuit to convert an input voltage into an output voltage. The converting circuit comprises a switch module and an LC filter. The switch module is coupled to an input voltage, and the LC filter is coupled to the switch module and generates the output voltage. The DC-DC converter comprises a system control circuit, a driver circuit and an output voltage adjusting circuit. The system control circuit generates a switch control signal according to a reference voltage and a state of the LC filter. The driver circuit controls the switch module according to a switch control signal for adjusting the output voltage in response to the reference voltage. The output voltage adjusting circuit is coupled to the driver circuit and determines whether adjusting the output voltage according to an adjusting reference voltage and the output voltage. If yes, the output voltage adjusts circuit controls the driver circuit to turn on the switch module to adjust the output voltage toward a predetermined adjusting voltage The output voltage adjusting mechanism of the present invention also increases the adjusting rate of the output voltage toward a target voltage that utilizes a nonlinear current.

It is to be understood that both the foregoing general description and the following, detailed description are exemplary, and are intended to provide further explanation of the invention as claimed. In order to make the features and the advantages of the invention comprehensible, exemplary embodiments accompanied with figures are described in detail below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
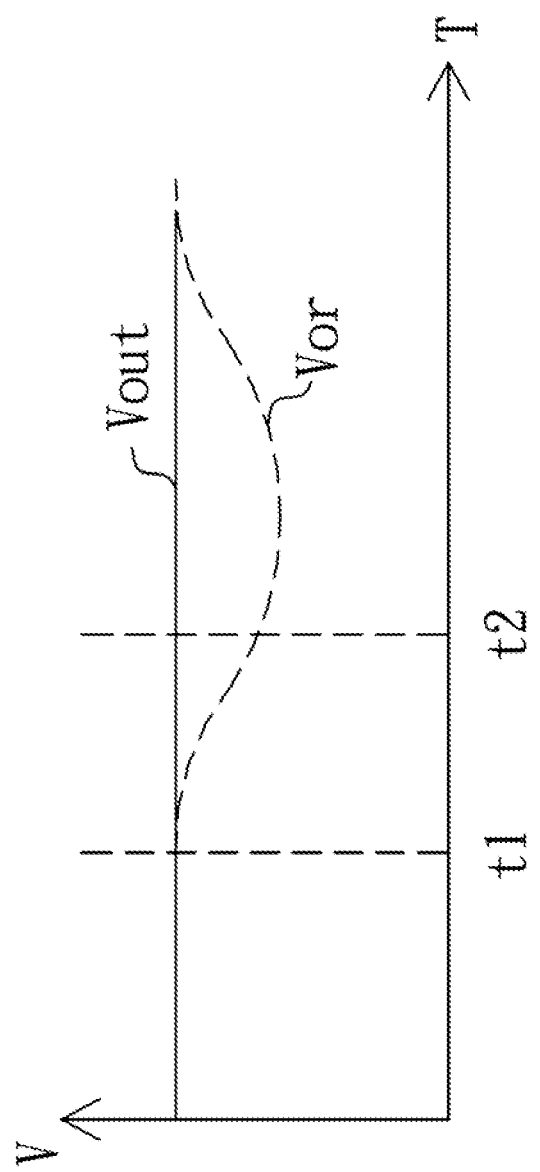
FIG. 1 is a diagram showings the waveforms of operating a conventional power management chip.
Figure 2:
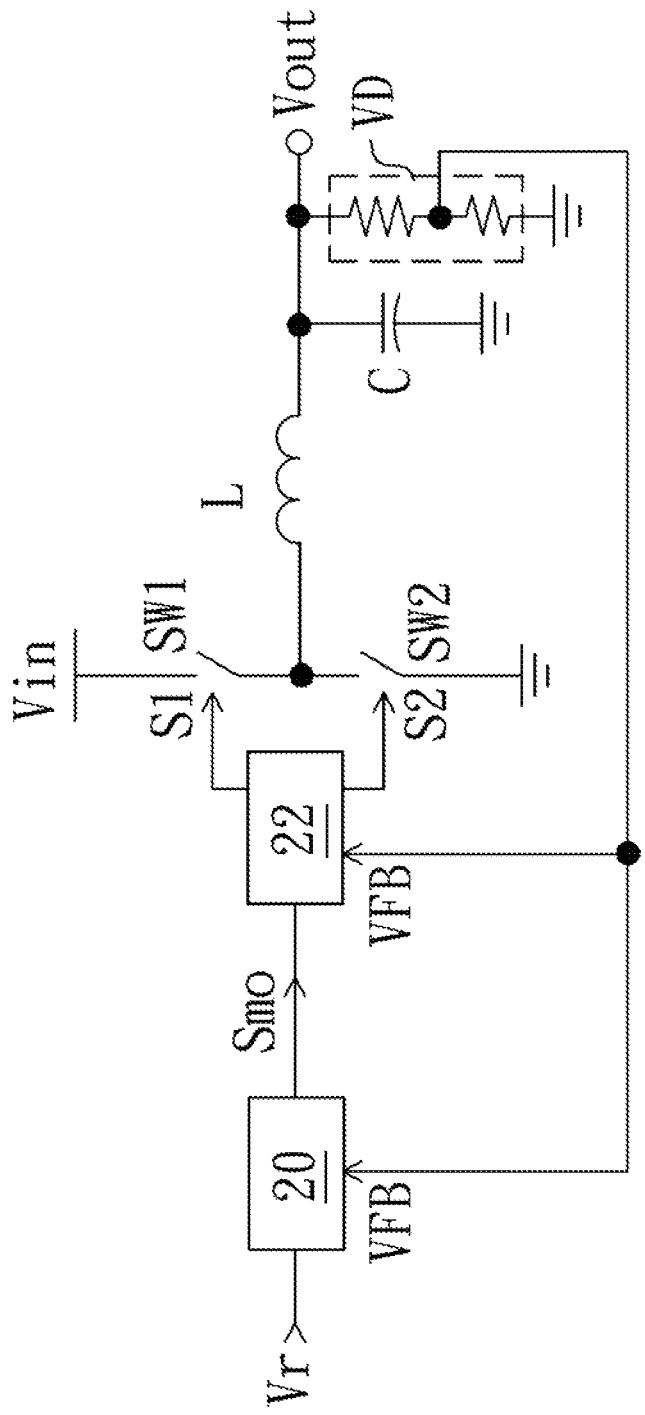
FIG. 2 is schematic diagram of a power converting circuit in the U.S. Pat. No. 7,855,864.
Figure 3:
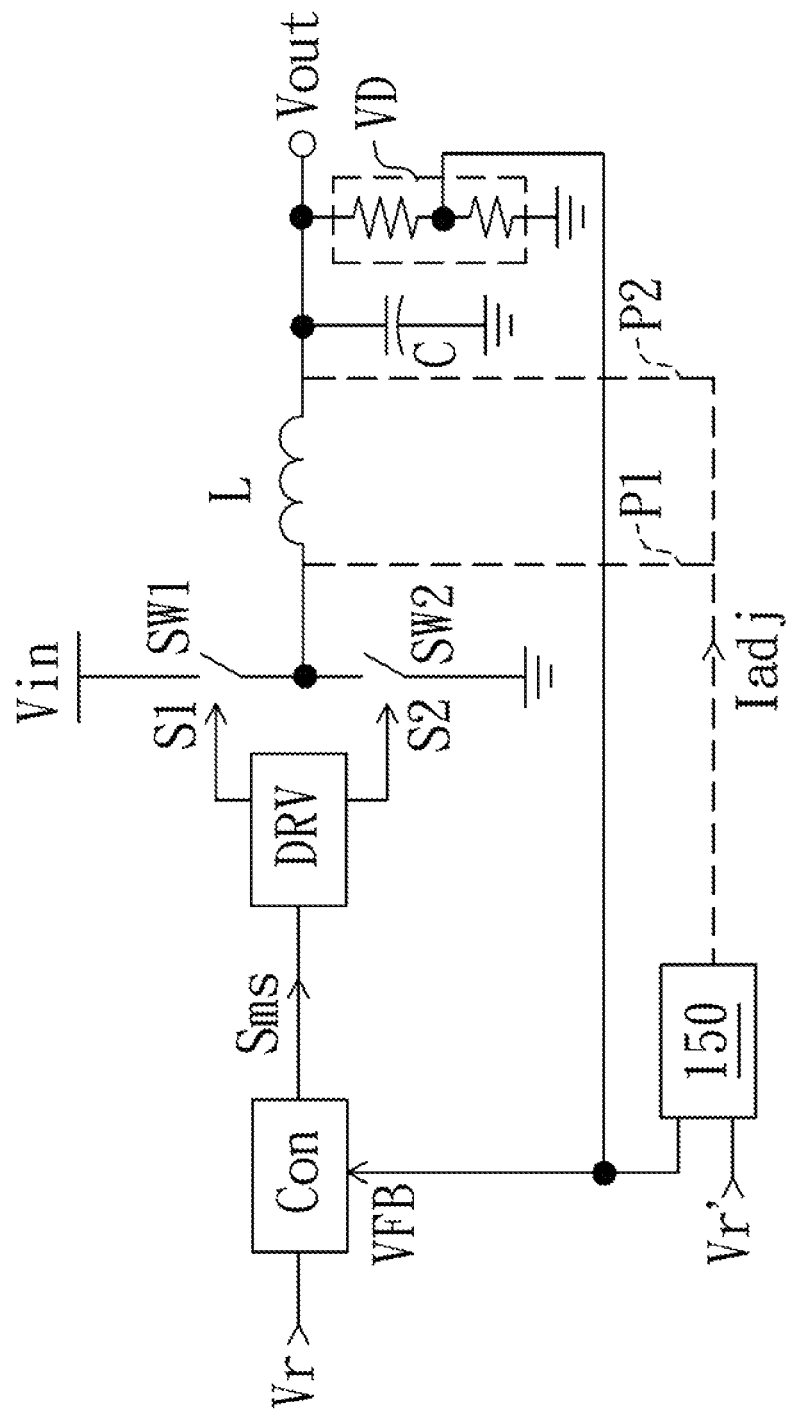
FIG. 3 is a block diagram according to a DC-DC converter of the present invention.

FIG. 3 is a block diagram according to a DC-DC converter of the present invention. The DC-DC converter controls a converting circuit to convert an input voltage Vin into an output voltage Vout. The converting circuit comprises a switch module and an LC filter. In the present embodiment, the switch module comprises a high-side transistor SW1 and a low-side transistor SW2 where are connected in series, one terminal of the switch module is coupled to the input voltage Vin and another terminal thereof is coupled to the ground. The LC filter comprises an inductance L and of capacitance C which are connected in series. One terminal of the LC filter is coupled to a connection point of the high-side transistor SW1 and the low-side transistor SW2 and another terminal thereof is coupled to the ground. A connection point of the inductance L and the capacitance C generates the output voltage Vout.

The DC-DC converter comprises a system control circuit Con, a driver circuit DRV and an output voltage adjusting circuit 150. The system control circuit Con detects a state of the LC filter and generates a switch control signal Sms according to a reference voltage Vr and the state of the LC filter. In the present embodiment, a voltage detecting circuit VD is coupled to the converting circuit and generates a detecting voltage VFB indicative of the output voltage Vout. The system control circuit Con determines the state of the LC filter according to the detecting voltage VFB. Certainly, the system control circuit Con may also detect a current of the inductance L or a current supplied to the load (not shown) to accordingly determine the state of the LC filter. The driver circuit DRV generates control signals S1 and S2 according to the switch control signal Sms to control the switch module for adjusting the output voltage Vout in response to the reference voltage Vr. The output voltage adjusting circuit 150 is coupled to the LC filter. For example the output voltage adjusting circuit 150 is coupled to the inductance L through a path P1 or/and the capacitance C through a path P2 to determine whether the output voltage adjusting circuit 150 generates an adjusting current Iadj for charging or discharging the capacitance C to adjust the output voltage Vout according to an adjusting reference voltage Vr' and the detecting voltage VFB. If yes, the output voltage adjusting circuit 150 adjusts the output voltage Vout toward a predetermined adjusting voltage for reducing the gap between the output voltage Vout and a target voltage corresponding to the reference voltage Vr.

Figure 4:
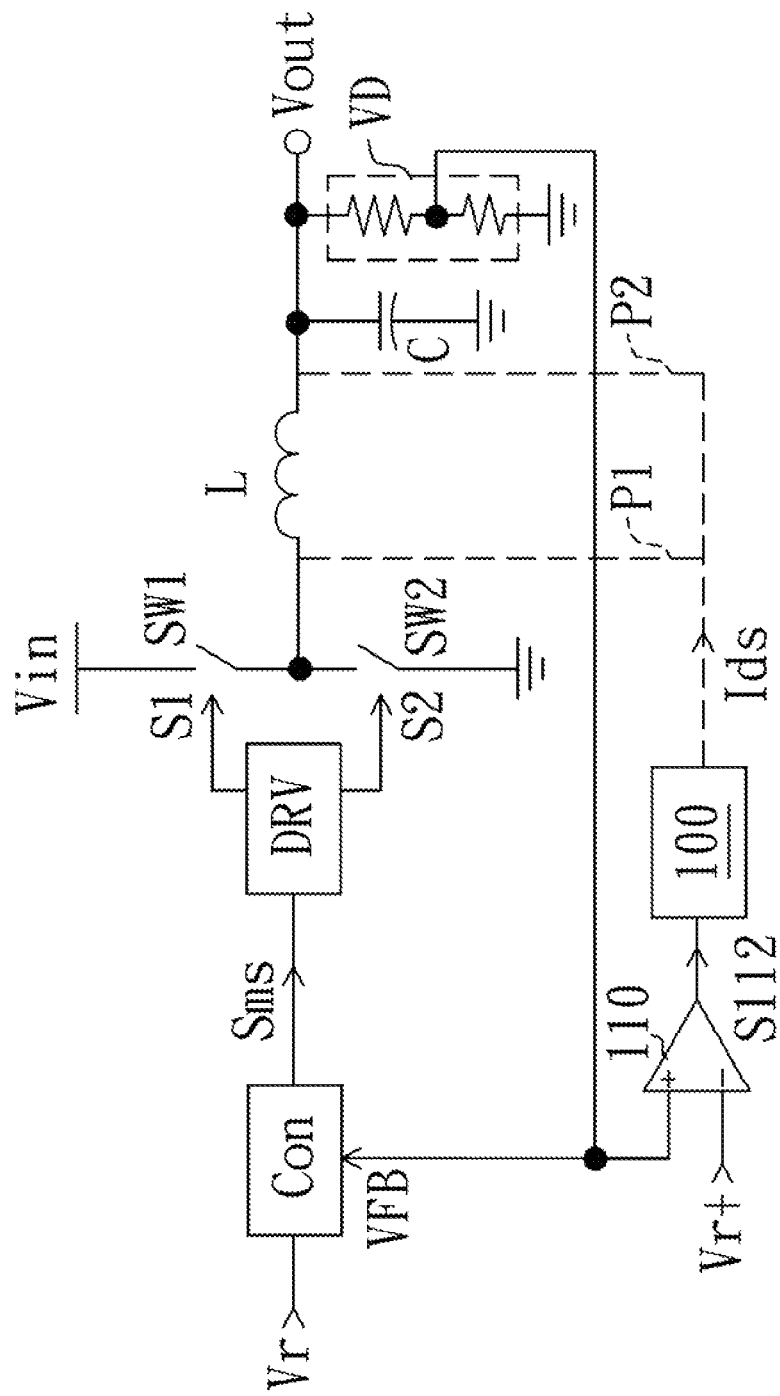
FIG. 4 is a schematic diagram of a DC-DC converter according to a first preferred embodiment of the present invention.

FIG. 4 is a schematic diagram of a DC-DC converter according to a first preferred embodiment of the present invention. Compared with the circuit as shown in FIG. 3, the output voltage adjusting circuit is further described in FIG. 4. In the present embodiment, the output voltage adjusting circuit comprises a discharging judging circuit 110 and a discharging circuit 100. The discharging judging circuit 110 generates a discharging judging signal S112 according to an adjusting reference voltage Vr+ and the detecting voltage VFB. The discharging circuit 100 reduces a stored power in the LC filter according to the discharging judging signal S112. The adjusting reference voltage Vr+ is higher than the reference voltage Vr. The system control circuit Con compares the detecting voltage VFB with an over-voltage reference voltage to determine whether the output voltage Vout is too high and activates the corresponding over-voltage protection. The adjusting reference voltage Vr+ is lower than the over-voltage reference voltage. Hence, when the output voltage Vout is higher than the target voltage, the discharging judging circuit 110 is triggered to generate the discharging judging signal S112 before the output voltage Vout reaches the over-voltage value of the over-voltage protection. The discharging circuit 100 is coupled to the LC filter through the path P1 or the path P2, and generates a discharging current Ids when the discharging circuit 100 receives the discharging judging signal S112 to release the electric charge stored in the capacitance C through the discharging circuit 100 and reduce the output voltage Vout. In the present embodiment, the discharging circuit 100 presets a predetermined adjusting time period and generates the discharging current ids when the discharging circuit 100 receives the discharging adjusting signal S112 and stops generating the discharging, current Ids after the predetermined adjusting time period.

Figure 5:
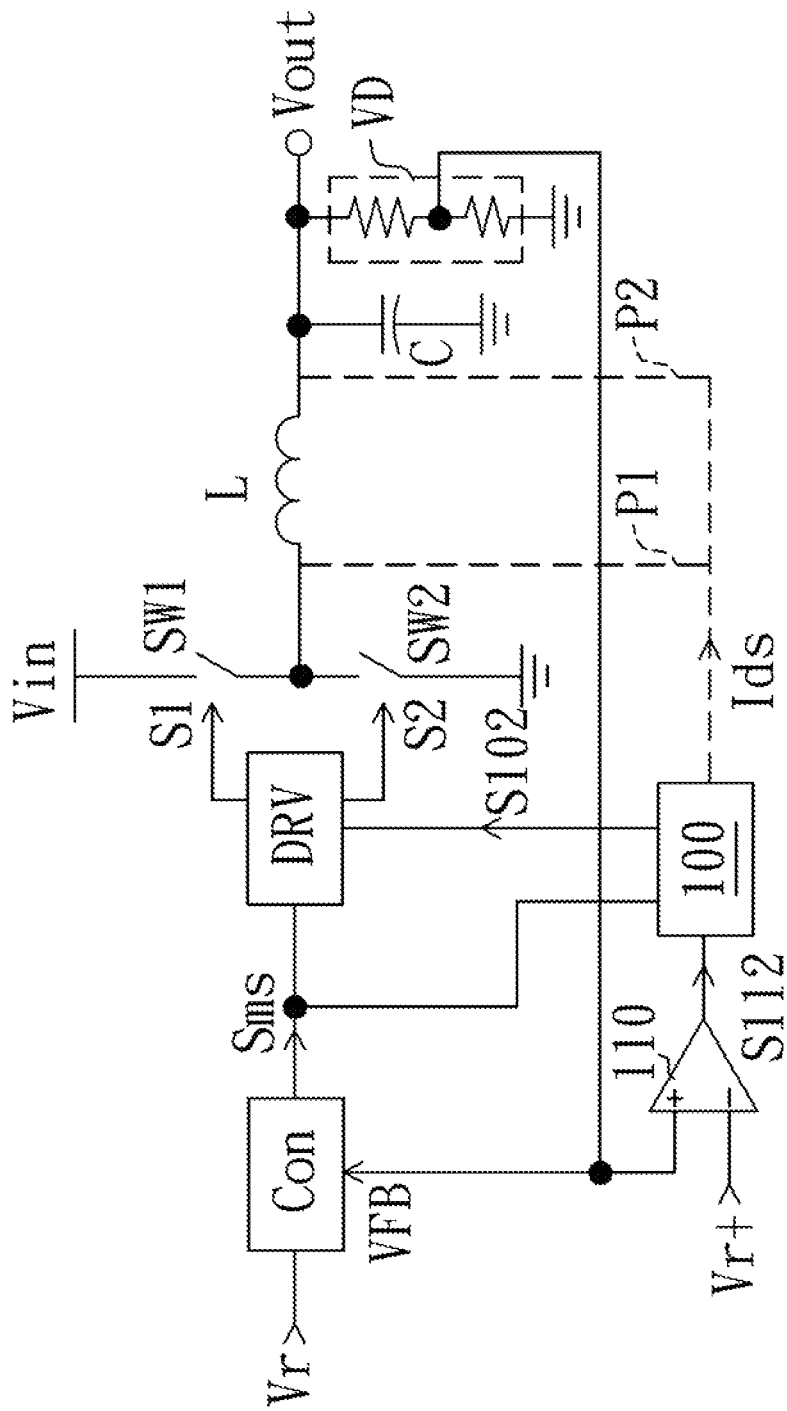
FIG. 5 is a schematic diagram of a DC-DC converter according to a second preferred embodiment of the present invention.

FIG. 5 is a schematic diagram of a DC-DC converter according to a second preferred embodiment of the present invention. Compared with the circuit as shown in FIG. 4, an output voltage adjusting circuit as shown in FIG. 5 further receives the switch control signal Sms to determine the suitable start time point, and simultaneously generates a blank signal S102 to stop the driver circuit DRV in order to avoid the driver circuit DRV and the output voltage adjusting circuit operating at the same time. When the DC-DC converter operates in the normal mode, the system control circuit Con can sequentially control the high-side transistor SW1 and the low-side transistor SW2 by the driver circuit DRV to adjust the output voltage Vout in response to the target voltage regardless of whether the output voltage adjusting circuit operating at the same time. Hence, when the system control circuit Con operates in the normal mode, the system control circuit Con may stop the output voltage adjusting circuit. Certainly, if the output voltage adjusting circuit simultaneously operates, the adjusting rate of the output voltage Vout toward the target voltage can be enhanced. When the system control circuit Con determines that the load is in light load and operates in the power-saving mode, such as a discontinuous current mode, a skip mode, diode emulation mode and etc., the system control circuit Con activates the output voltage adjusting circuit. Of course, in addition to the switch control signal Sms, the system control circuit Con may activates the output voltage adjusting circuit by other signals, for example, the module control signal Smo mentioned in the prior art. When the system control circuit operates in the power-saving mode and the output voltage adjusting circuit operates for adjusting the output voltage Vout, the output voltage adjusting circuit may generates the blank signal S102 to avoid that the driver circuit DRV simultaneously operates to affect the adjusting operation of the output voltage adjusting circuit.

Figure 6:
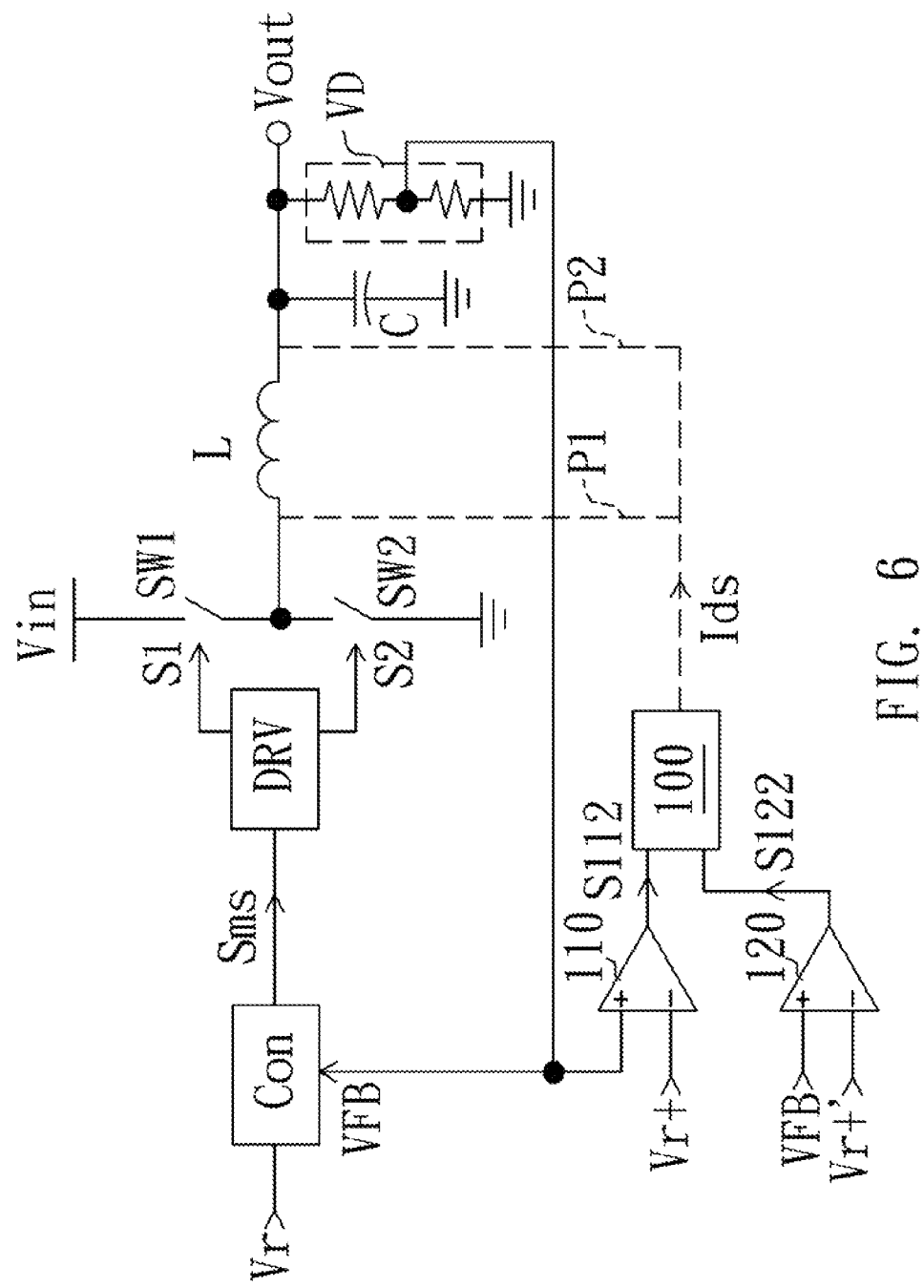
FIG. 6 is a schematic diagram of a DC-DC converter according to a third preferred embodiment of the present invention.

FIG. 6 is a schematic diagram of a DC-DC converter according to a third preferred embodiment of the present invention. Compared with the circuit as shown in FIG. 4, the output voltage adjusting circuit as shown in FIG. 6 further comprises an adjusting ending circuit 120. The adjusting ending circuit 120 generates an adjusting stop signal S122 according to an adjusting, target voltage Vr+ and the detecting voltage VFB, and the output voltage Vout reaches the adjusting target voltage Vr+' at this time. The discharging circuit 100 starts according to the discharging judging signal S112 for reducing the stored power in the LC filter, and then The discharging circuit 100 stops reducing the stored power in the LC filter when the discharging circuit 100 receives the adjusting stop signal S122. The adjusting target voltage Vr+' is lower than the adjusting reference voltage and the adjusting target voltage Vr+' is preferably equal to the reference voltage Vr. Thus, the output voltage Vout is adjusted by the discharging circuit 100 until the output voltage Vout reaches the target voltage.

Figure 7:
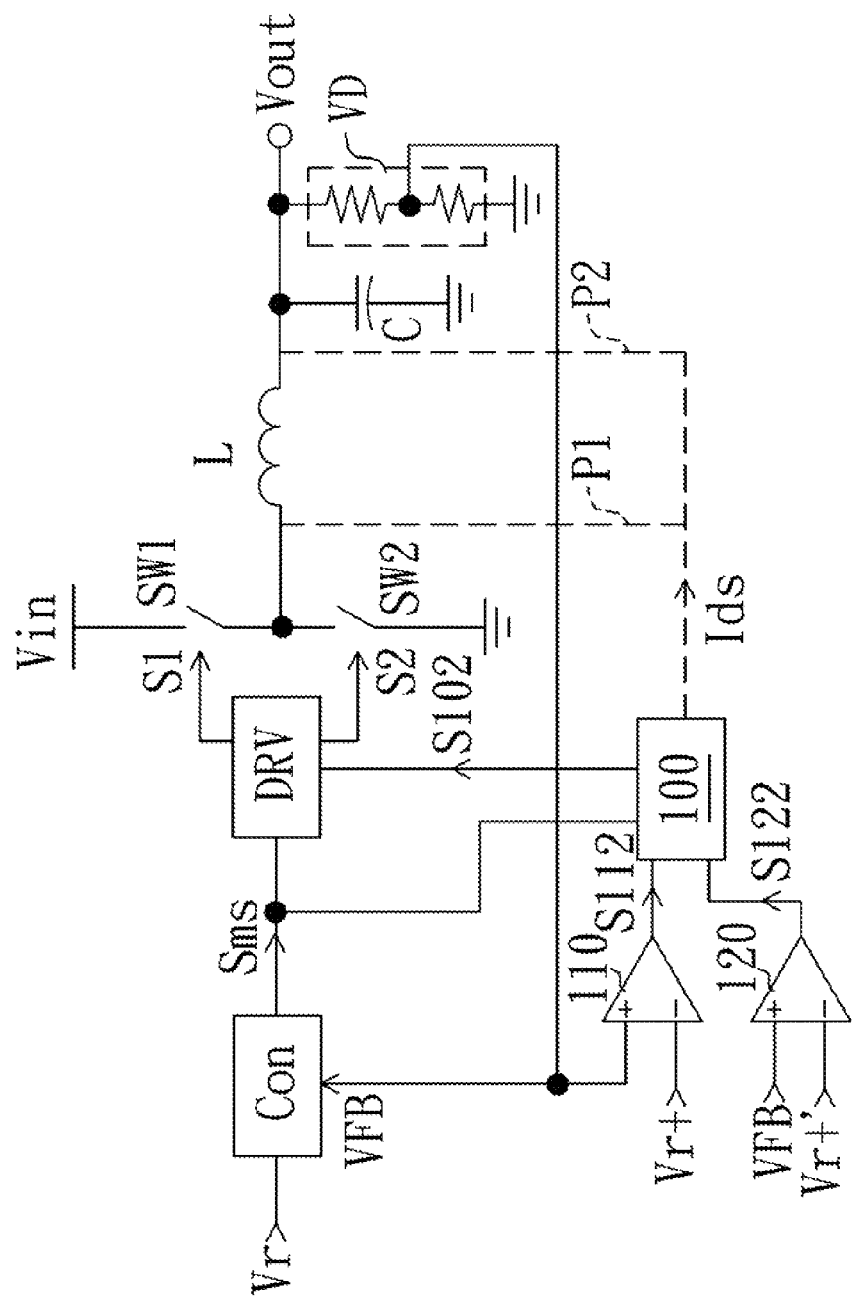
FIG. 7 is a schematic diagram of a DC-DC converter according to a fourth preferred embodiment of the present invention.

FIG. 7 is a schematic diagram of a DC-DC converter according to a fourth preferred embodiment of the present invention. Compared with the circuit as shown in FIG. 6, the present embodiment incorporate the switch control signal Sms as shown in FIG. 5, which is generated by the system control circuit Con to determine the output voltage adjusting circuit to be operating or not in the circuit as shown in FIG. 6. The operations of circuits in FIG. 7 can refer to the corresponding description in FIG. 5 and FIG. 6, and it is not repeated here.

Figure 8:
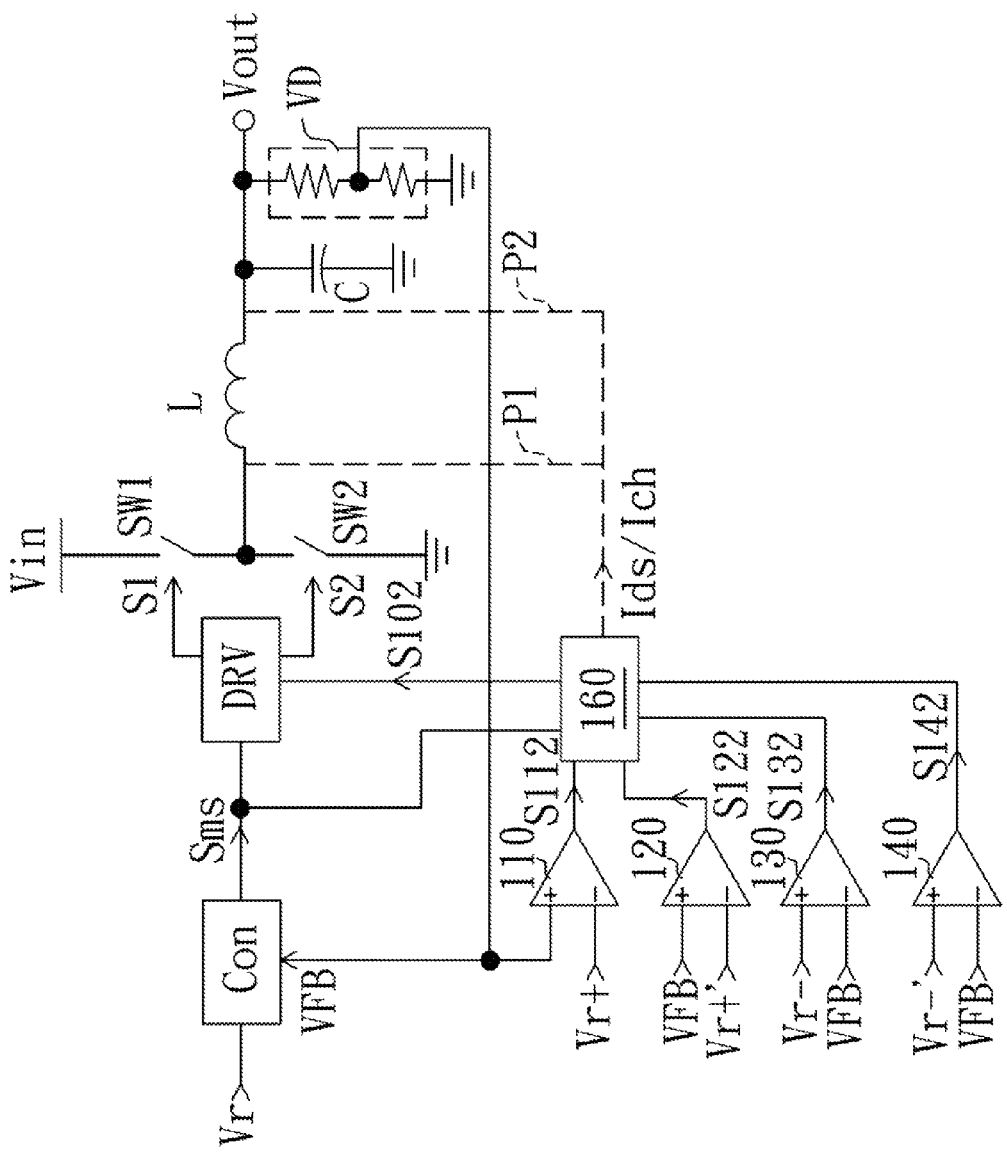
FIG. 8 is a schematic diagram of a DC-DC converter according, to a fifth preferred embodiment of the present invention.

FIG. 8 is a schematic diagram of DC-DC converter according to a fifth preferred embodiment of the present invention. Compared with the circuit as shown in FIG. 7, the output voltage adjusting circuit of the present embodiment further comprises a charging judging circuit 130, the adjusting ending circuit 140 and charging/discharging circuit 160. The charging/discharging circuit 160 comprises a charging sub-circuit and a discharging sub-circuit. The discharging judging circuit 110 generates the discharging judging signal S112 according to the adjusting reference signal Vr+ and the detecting voltage VFB. The adjusting ending circuit 120 generates the adjusting stop signal S122 according to the adjusting target voltage Vr+' and the detecting voltage VFB. The charging/discharging circuit 160 starts the discharging, sub-circuit to generate the discharging current Ids according, to the discharging judging signal S112 for reducing the stored power in the LC filter, and then stops the discharging sub-circuit when the charging/discharging circuit 160 receives the adjusting, stop signal S122. The adjusting reference voltage Vr+' is higher than the reference voltage Vr+ and the adjusting target voltage Vr+' is lower than the adjusting reference voltage Vr+. The adjusting target voltage Vr+ is preferably set to be equal to the reference voltage Vr.

The charging judging circuit 130 generates a charging judging signal S132 according to an adjusting reference Vr− and the detecting signal VFB. The adjusting ending circuit 140 generates an adjusting stop signal S142 according to an adjusting target voltage and the detecting voltage VFB, and the output voltage Vout reaches to the adjusting target voltage Vr−' at this time. The charging/discharging circuit 160 starts the charging sub-circuit to generate charging current Ich according to the charging judging signal S132 for increasing a power stored in the LC filter, and then stops the charging sub-circuit when the charging/discharging circuit 160 receives the adjusting stop signal S142. The adjusting reference voltage Vr− is lower than the reference voltage Vr, and the adjusting target voltage Vr−' is higher than the adjusting reference voltage Vr−. The adjusting target voltage Vr−' is preferably set to be equal to the reference voltage Vr.

The charging judging circuit 130, the adjusting ending circuit 140 and the charging sub-circuit of the charging and discharging circuit 160 can independently exist in the DC-DC converter to perform respective function. That is, the output voltage adjusting circuit may have only the discharging function, such as the circuits as shown in FIG. 4 to FIG. 7; the output voltage adjusting circuit may have only the charging function; or the output voltage adjusting circuit may have both the discharging and charging functions as shown in FIG. 8. Certainly, the output voltage adjusting circuit with the charging function may omit the adjusting ending circuit 140, and determine the adjusting, ending time point according to a predetermined adjusting time period. The system control circuit Con also may activate the charging function of the output voltage adjusting circuit in power-saving mode.

Figure 9:
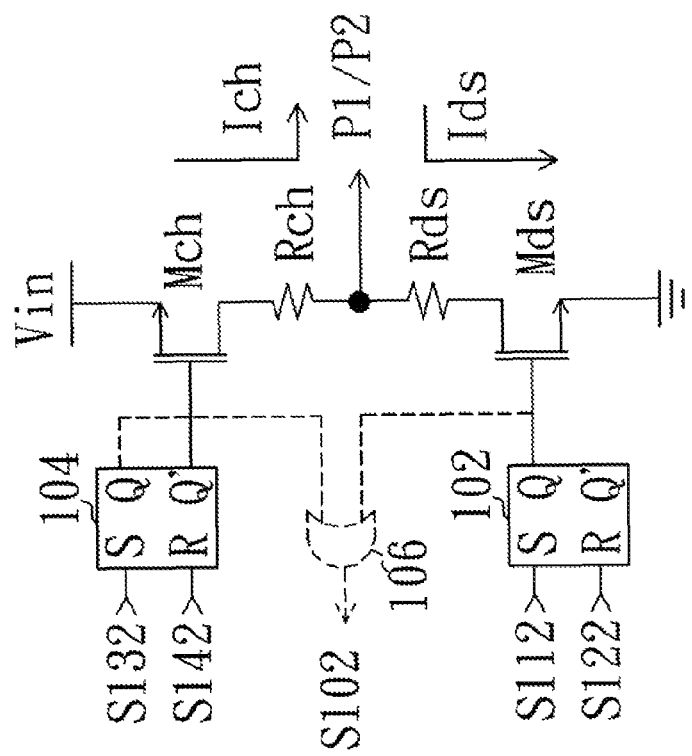
FIG. 9 is a schematic diagram of an output voltage adjusting circuit according to a first preferred embodiment of the present invention.

FIG. 9 is a schematic diagram of an output voltage adjusting circuit, according to a first preferred embodiment of the present invention. The output voltage adjusting circuit comprises SR flip-flops 102 and 104, a charging switch Mch, a discharging switch Mds, a charging current limiting resistor Rch and a discharging current limiting resistor Rds. The SR flip-flop 102 is coupled to the discharging switch Mds, and the discharging switch Mds is coupled to a path P1 or a path P2 through the discharging current limiting resistor Rds. The SR flip-flop 104 is coupled to the charging switch Mch, and the discharging switch Mch is coupled to the path P1 or the path P2 through the charging current limiting resistor Rch. Please Referred to FIG. 8, the discharging judging circuit 110 generates the discharging judging signal S112 when the detecting, voltage VFB is higher than the adjusting reference voltage Vr+. At this time, the SR flip-flop 102 turns on the discharging switch Mds to make a discharging current Ids flow through the charging current limiting resistor Rds and the discharging switch Mds to discharge the capacitance C for reducing the output voltage Vr+. The adjusting ending circuit 120 generates the adjusting stop signal S122 when the detecting voltage VFB is reduced to be lower than the adjusting target voltage Vr+'. At this time, the SR flip-flop 102 cuts the discharging switch Mds off for stopping the discharging current Ids to end the discharging for the output voltage Vout. Oppositely, the charging judging circuit 130 generates the charging judging signal S132 when the detecting voltage VFB is lower than the adjusting reference voltage Vr−. At this time, the SR flip-flop 104 turns on the charging switch Mch to make a charging current Ich flow through the charging switch Mch and the charging current limiting resistor Rch to charge the capacitance C for raising the output voltage Vout. The adjusting ending circuit 140 generates the adjusting stop signal S142 when the detecting voltage VFB is raised to be higher than the adjusting target voltage Vr−'. At this time, the SR flip-flop 104 cuts the charging switch Mch off for stopping the charging current Ich to end the charging for the output voltage Vout.

Additionally, for coordinating with the embodiments as shown in FIG. 5, FIG. 7 and FIG. 8, in which the blank signal S102 is applied to stop the operation of the driver circuit DRV when the output voltage adjusting circuit is adjusting the output voltage, an OR gate 106 is added for generating the blank signal S102. The OR gate 106 is coupled to the SR flip-flops 102 and 104. The OR gate 106 generates the blank signal S102 to stop the driver circuit DRV when one of the charging switch Mch and the discharging switch Mds is turned on.

Figure 10:
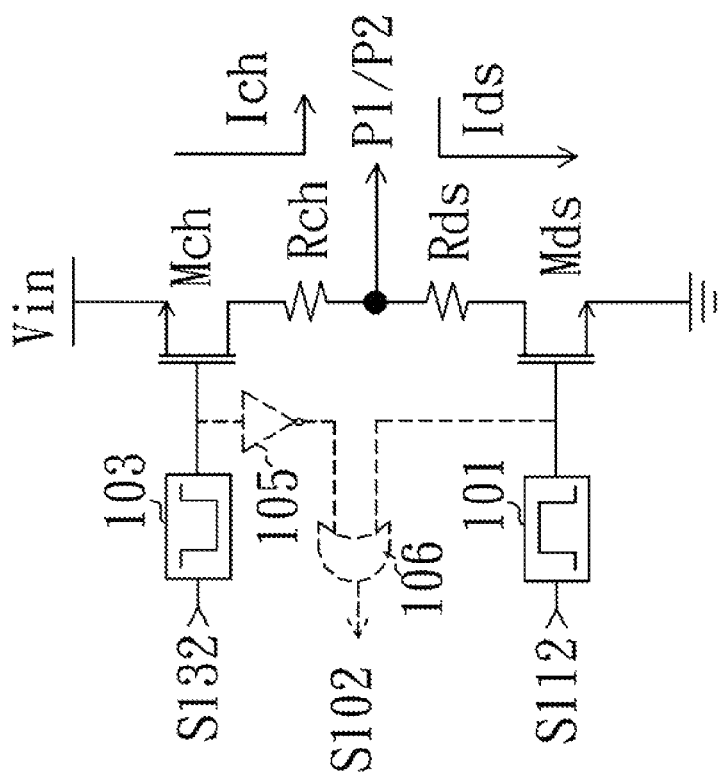
FIG. 10 is a schematic diagram of an output voltage adjusting circuit according to a second preferred embodiment of the present invention.

FIG. 10 is a schematic diagram of an output voltage adjusting circuit according to a second preferred embodiment of the present invention. The output voltage adjusting circuit comprises rising edge triggered circuits 101 and 103, a charging switch Mch and a discharging switch Mds. Compared with the circuit as shown in FIG. 9, the present embodiment uses a predetermined adjusting time period for adjusting the output voltage. When the rising edge triggered circuit 101 detects that the discharging judging signal S112 is generated, the discharging switch Mds is turned on for a predetermined adjusting time period and then cut off if the detecting voltage VFB is still higher or reverts to be higher than the adjusting reference voltage Vr+, the rising edge triggering circuit 101 repeatedly turns on the discharging switch Mds for the predetermined adjusting time period. The default output signal of the rising edge triggering circuit 103 is at a high level. When the rising edge triggering circuit 103 detects that the charging judging signal S132 is generated, the output signal of the rising edge triggering circuit 103 is at low level and so the charging switch Mch is turned on for the predetermined adjusting time period and then cut off. If the detecting voltage VFB is still lower or reverts to be lower than the adjusting reference voltage Vr−, the rising edge triggering circuit 103 repeatedly turns on the charging switch Mch for the predetermined adjusting time period.

Furthermore, if the blank signal S102 is necessary to be provided in some applications, an inverter 105 and an OR gate 106 may be added to provide the blank signal S102. The OR gate 106 generates the blank signal S102 when one of the charging switch Mch and the discharging switch Mds is turned on.

Figure 11:
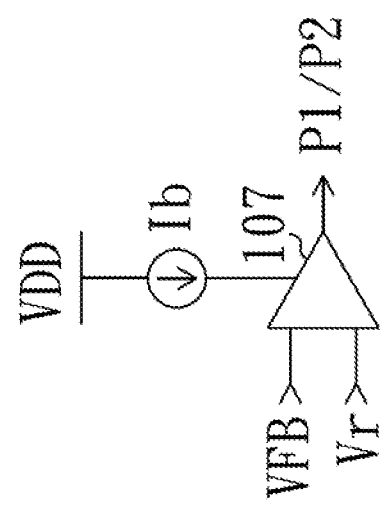
FIG. 11 is a schematic diagram of a current source according to a first preferred embodiment of the present invention.

It is worth to notice that the output voltage adjusting circuit of the present invention may only need the discharging function according to the practical application and so the rising edge triggering circuit 103 and the charging switch Mch can selectively be omitted, or may only need the charging function according to the practical application and the rising edge triggering circuit 101 and the discharging switch Mds can selectively be omitted. FIG. 11 is a schematic diagram of a current source according to a first preferred embodiment of the present invention. The current source of the present embodiment serves as the charging circuit and/or the discharging circuit as shown in the mentioned-above embodiments. The current source comprises a buffering circuit 107 and a bias current source Ib. The bias current source Ib is coupled to a driving voltage VDD to provide a bias current for the buffering circuit 107. The buffering circuit 107 receives the detecting voltage VFB and the reference voltage Vr and generates a current to the path P1 or the path P2 according to the potential difference of the detecting voltage VFB and the reference voltage Vr. The current source provides the larger current when the difference of the output voltage Vout and the target voltage are bigger to increase an adjusting rate of the output voltage Vout. Hence, the current source of the present embodiment has a perfect adaptability as being the discharging circuit and the charging circuit. The current of the bias current source Ib may be set according to the capacity value of the capacitance C of the LC filter providing a better adjusting current adapted to different capacitances C. For example, the current of the bias current source Ib can be set according to an over-current value of the DC-DC converter. The setting of the over-current value generally is set according to the capacity value of the capacitance C. Hence, the current setting of the bias current source Ib can gain the better adjusting ability for the output voltage Vout.

Figure 12:
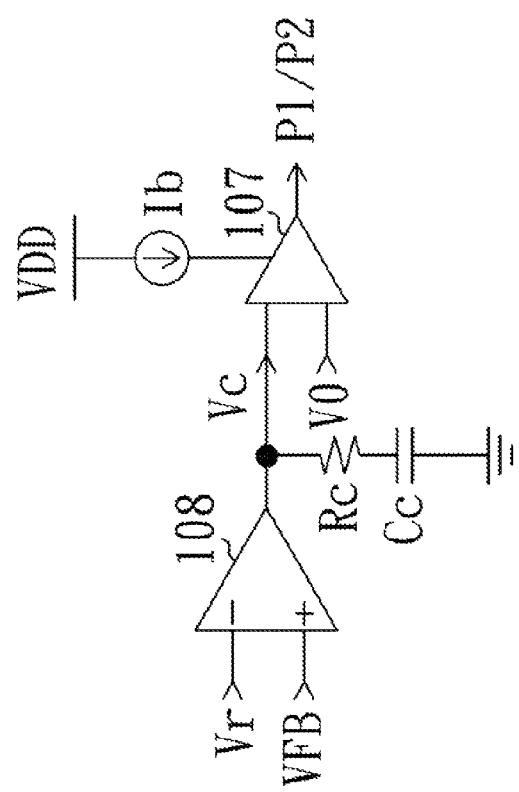
FIG. 12 is a schematic diagram of a current source according to a second preferred embodiment of the present invention.

FIG. 12 is a schematic diagram of a current source according to a second preferred embodiment of the present invention. Compared with the circuit as shown in FIG. 11, the current source of the present embodiment additionally comprises an error amplifier 108 and a compensation circuit, wherein the compensation circuit comprises a resistor Rc and a capacitance Cc. The error amplifier 108 receives the reference voltage Vr and the detecting voltage VFB, and cumulatively charges the capacitance Cc in response to the potential difference of the reference voltage Vr and the detecting voltage VFB. The buffering circuit 107 receives a compensated voltage Vc of the compensating circuit and a buffering reference voltage V0 and accordingly generates a current to the path P1 or the path P2. By the error amplifier 108, the current of the buffering circuit 107 adjusts with time and the potential difference of the reference voltage Vr and the detecting voltage VFB to provide a nonlinear current. Through the nonlinear current, the adjusting ability for the output voltage Vout of the current source can be further increased.

Figure 13:
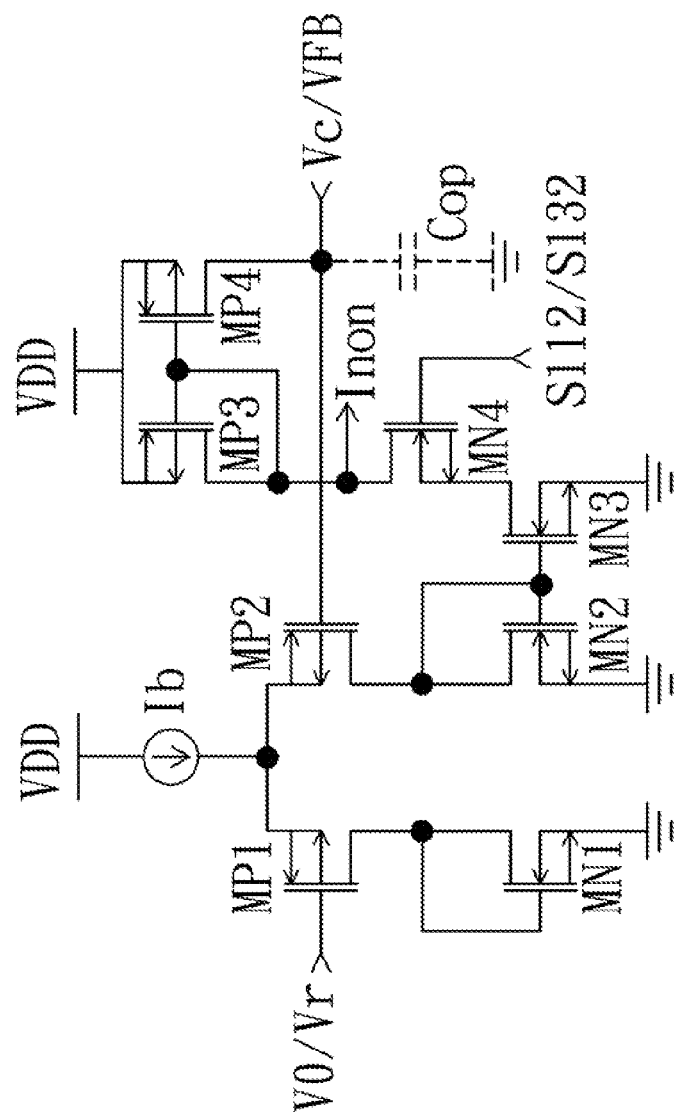
FIG. 13 is a circuit diagram of a current source according to a first preferred embodiment of the present invention.

FIG. 13 is a circuit diagram of a current source according to a first preferred embodiment of the present invention. A differential pair comprises transistors MP1, MP2, MN1 and MN2 for receiving the reference voltage Vr and the detecting voltage VFB, or buffering the reference voltage V0 and the compensated voltage Vc. The bias current source Ib provides the required bias current for the differential pair operating. A current mirror comprises transistors MP3 and MP4. The transistor MP4 is coupled to a capacitance Cop. The capacitance Cop may be the capacitance Cc of the compensating circuit or an independent capacitance, wherein the current of the current mirror is varied with the detecting voltage VFB or the compensated voltage Vc. A nonlinear current Inon is provided by the sum of a current of the differential pair and the current of the current mirror. The transistor MN4 coupled to the current mirror and the differential pair, and starts to provide the nonlinear current Inon according to the discharging judging signal S112 or the charging judging signal S132 to adjust the output voltage Vout or stops providing the nonlinear current Inon to stop adjusting the output voltage Vout.

Figure 14:
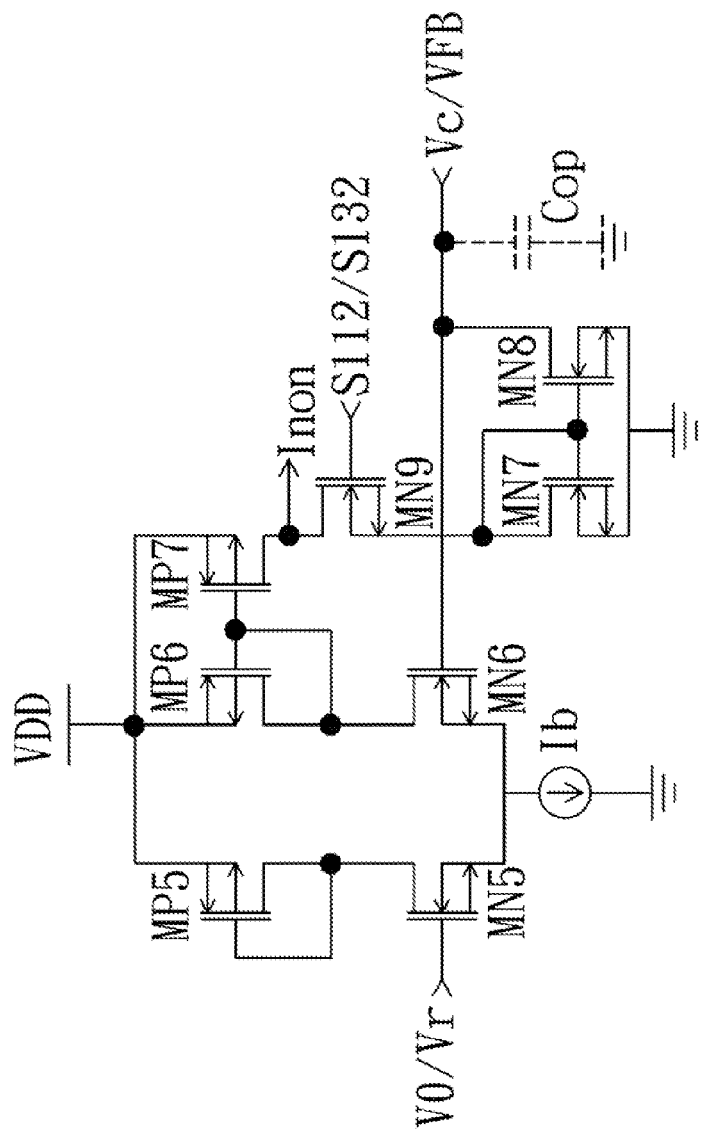
FIG. 14 is a circuit diagram of a current source according to a second preferred embodiment of the present invention.

FIG. 14 is a circuit diagram of a current source according to a second preferred embodiment of the present invention. A differential pair comprises transistors MP5, MP6, MN5 and MN6 for receiving the reference voltage Vr and the detecting voltage VFB, or buffering the reference voltage V0 and the compensated voltage Vc. The bias current source Ib provides the required bias current for the differential pair operating. A current mirror comprises transistors MN7 and MN8. The transistor MN8 is coupled to a capacitance Cop. The current of the current mirror is varied with the detecting voltage VFB or the compensated voltage Vc. A nonlinear current Inon, the sum of a current of the differential pair provided by the transistor MP7 and a current of the current mirror, is provided. The transistor MN9 coupled to the current mirror and the differential pair starts to provide the nonlinear current Inon according to the discharging judging signal S112 or the charging judging signal S132 to adjust the output voltage Vout or stop providing the nonlinear current Inon to stop adjusting the output voltage Vout.

Figure 15:
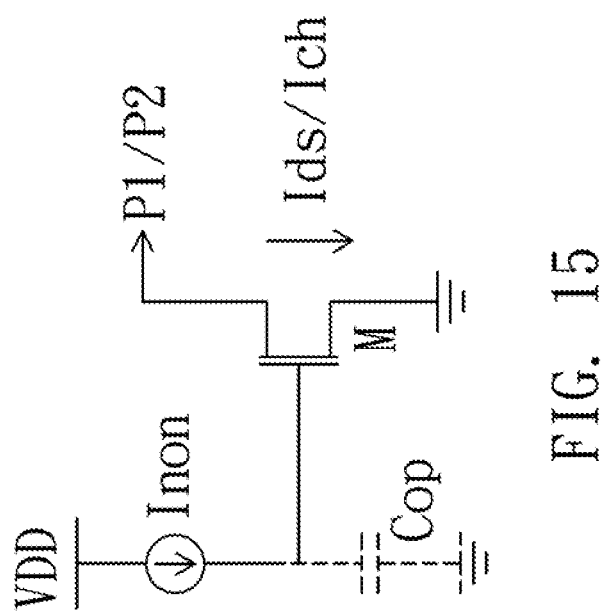
FIG. 15 is a circuit diagram of a current source according to a third preferred embodiment of the present invention.

FIG. 15 is a circuit diagram of a current source according to a third preferred embodiment of the present invention. The nonlinear current Inon and the capacitance Cop are connected in series and a connection point thereof is coupled to a controlled terminal of the transistor M. The capacitance Cop is simultaneously coupled to an output terminal of the error amplifier 108 as shown in FIG. 12. The transistor M is coupled to the path P1 or the path P2. Therefore, the current output ability of the transistor M is varied according to the voltage of the capacitance Cop, and the voltage of the capacitance Cop is varied according to a current of the nonlinear current and a output current of the error amplifier. The transistor M is used to provide the charging current Ich or the discharging current Ids to provide a better ability for adjusting the output voltage.

Figure 16:
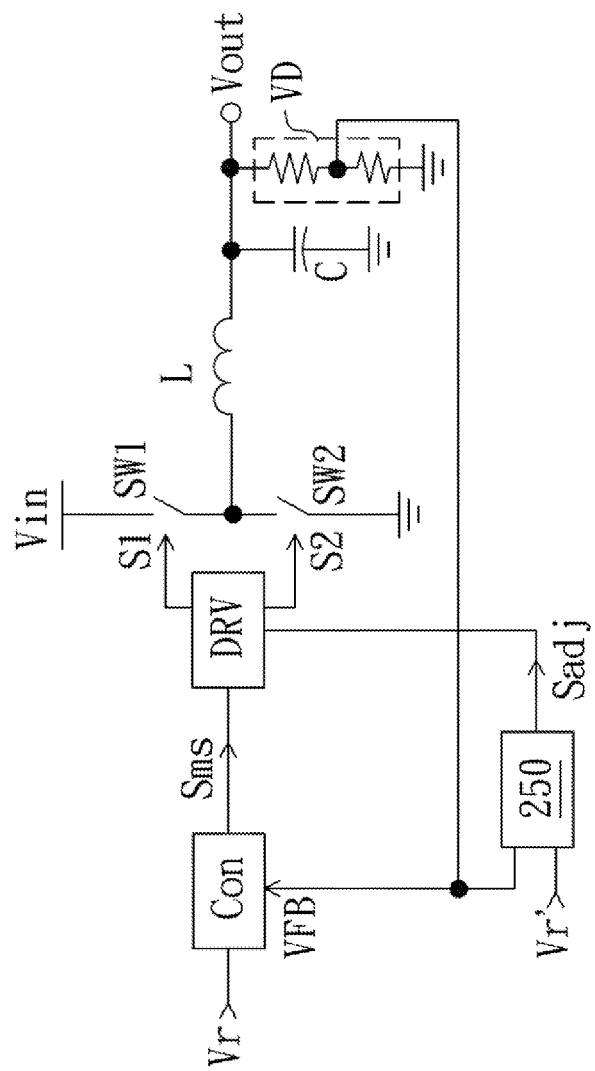
FIG. 16 is schematic diagram of a DC-DC converter according to a sixth preferred embodiment of the present invention.

The present invention directly charges and discharges the output voltage Vout through the output voltage adjusting circuit to make the output voltage Vout be equal to the target voltage for avoiding, erroneously triggering protection. The present invention may provide the charging and discharging function for adjusting the output voltage Vout by the high-side transistor SW1 and the low-side transistor SW2. FIG. 16 is schematic diagram of a DC-DC converter according to a sixth preferred embodiment of the present invention. Compared with the circuit as shown in FIG. 3, an output voltage adjusting circuit 250 of the present embodiment is coupled to the driver circuit DRV and determines whether adjusting, the output voltage Vout toward the predetermined adjusting, voltage according to the adjusting reference Vr' and the detecting voltage VFB indicative of the output voltage Vout. If yes, the output voltage adjusting circuit 250 generates an adjusting signal Sadj to the driver circuit DRV for controlling the switch module to adjust the output voltage toward the predetermined adjusting voltage. For example, when the output voltage Vout is too high, the output voltage adjusting circuit 250 generates the adjusting, signal Sadj to make the driver circuit DRV turn on the low-side transistor SW2 and discharge the capacitance C through the low-side transistor SW2 for reducing the output voltage Vout. When the output voltage Vout is too low, the output voltage adjusting circuit 250 generates the adjusting signal Sadj to make the driver circuit DRV turn on the high-side transistor SW1 and charge the capacitance C through the high-side transistor SW1 for increasing the output voltage Vout. The turn-on period time of the high-side transistor SW1 and the low-side transistor SW2 may set as that mentioned in the previous embodiments, i.e., a predetermined adjusting target voltage or a predetermined adjusting time period. The circuits of the previous embodiments can be applied in the present embodiment without affecting the function of the present invention. For example, the system control circuit Con starts the output voltage adjusting circuit when the system control circuit Con determines that the load is light load and operates in the power-saving mode; the output voltage adjusting circuit generates the blank signal S102 to avoid the driver circuit DRV adjusting simultaneously the output voltage Vout and affecting the adjusting operation of the output voltage adjusting circuit.

While the preferred embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

What is claimed is:

1. A DC-DC converter, adapted to control a converting circuit to convert an input voltage into an output voltage, wherein the converting circuit comprises a switch module coupled to the input voltage and an LC filter coupled the switch module to generate the output voltage, the DC-DC converter comprising:
   a system control circuit for generating a switch control signal according to a reference voltage and a state of the LC filter;
   a driver circuit for controlling the switch module according to the switch control signal to adjust the output voltage in response to the reference voltage; and
   an output voltage adjusting circuit, coupled to the LC filter, the output voltage adjusting circuit being configured for determining whether to adjust the output voltage according to a adjusting reference voltage and a detecting voltage indicative of the output voltage, and if yes, the output voltage adjusting circuit adjusts the output voltage toward a predetermined adjusting voltage;
   wherein the output voltage adjusting circuit stops adjusting a stored power in the LC filter when the output voltage adjusting circuit adjusts the stored power in the LC filter for a predetermined adjusting time period;
   wherein the output voltage adjusting circuit adjusts the output voltage toward the predetermined adjusting voltage by utilizing a nonlinear current, and the nonlinear current is provided by a current of a buffering circuit or a sum of a current of a differential pair and a current of a current mirror.

2. The DC-DC converter of claim 1, wherein the output voltage adjusting circuit comprises a discharging judging circuit and a discharging circuit, the discharging judging circuit generates a discharging judging signal according to the adjusting reference voltage and the detecting voltage and the discharging circuit reduces the stored power in the LC filter according to the discharging judging signal.

3. The DC-DC converter of claim 2, wherein the output voltage adjusting circuit stops the discharging circuit reducing the stored power in the LC filter when the discharging circuit reduces the stored power in the LC filter for the predetermined adjusting time period.

4. The DC-DC converter of claim 2, wherein the discharging circuit comprises a current source, the current of the current source is set according to an over-current value of the DC-DC converter.

5. The DC-DC converter of claim 2, wherein the discharging circuit comprises a current source, the current of the current source is adjusted according to the output voltage and the reference voltage.

6. The DC-DC converter of claim 2, wherein the system control circuit activates the output voltage adjusting circuit when the system control circuit judges the DC-DC converter operating in a power-saving mode.

7. The DC-DC converter of claim 1, wherein the output voltage adjusting circuit comprises a charging judging circuit and a charging circuit, the charging judging circuit generates a charging judging signal according to the adjusting reference voltage and the detecting voltage, and the charging circuit increases the stored power in the LC filter according to the charging judging signal.

8. The DC-DC converter of claim 7, wherein the system control circuit activates the output voltage adjusting circuit when the system control circuit judges the DC-DC converter operating in a power-saving mode.

9. The DC-DC converter of claim 7, wherein the output voltage adjusting circuit stops the charging circuit increasing the stored power in the LC filter when the charging circuit increases the stored power in the LC filter for the predetermined adjusting time period.

10. The DC-DC converter of claim 1, wherein the system control circuit activates the output voltage adjusting circuit when the system control circuit judges the DC-DC converter operating in a power-saving mode.

11. A DC-DC converter, adapted to control a converting circuit to convert an input voltage into an output voltage, wherein the converting circuit comprises a switch module coupled to the input voltage and an LC filter coupled to the switch module to generate the output voltage, the DC-DC converter comprising:
  a system control circuit for generating a switch control signal according to a reference voltage and a state of the LC filter;
  a driver circuit for controlling the switch module according to the switch control signal to adjust the output voltage in response to the reference voltage; and
  an output voltage adjusting circuit, coupled to the driver circuit, the output voltage adjusting circuit being configured for determining whether to adjust the output voltage according to an adjusting reference voltage and a detecting voltage being indicative of the output voltage, and if yes, the output voltage adjusting circuit controls the driver circuit to turn on the switch module to adjust the output voltage toward a predetermined adjusting voltage;
  wherein the output voltage adjusting circuit stops adjusting a stored power in the LC filter when the output voltage adjusting circuit adjusts the stored power in the LC filter for a predetermined adjusting time period;
  wherein the output voltage adjusting circuit adjusts the output voltage toward the predetermined adjusting voltage by utilizing a nonlinear current, and the nonlinear current is provided by a current of a buffering circuit or a sum of a current of a differential pair and a current of a current mirror.

12. The DC-DC converter of claim 11, wherein the system control circuit activates the output voltage adjusting circuit when the system control circuit judges the DC-DC converter operating in a power-saving mode.

* * * * *